United States Patent [19]
Williams

[11] 3,794,364
[45] Feb. 26, 1974

[54] CONDUIT END CONNECTION

[75] Inventor: Frank Thomas Williams, Somerville, N.J.

[73] Assignee: Johns-Manville Corporation, New York, N.Y.

[22] Filed: Dec. 27, 1971

[21] Appl. No.: 212,402

[52] U.S. Cl. .................. 285/390, 29/157, 29/458, 113/116 UT, 138/173, 285/DIG. 4, 72/367
[51] Int. Cl. ............................................. F16i 15/00
[58] Field of Search .......... 138/155, 173; 72/367 X; 113/116 UT, 116 EE; 29/458, 525, 157; 285/55, 424, 260, 183, 390, DIG. 4

[56] References Cited
UNITED STATES PATENTS

| | | | |
|---|---|---|---|
| 525,061 | 8/1894 | Schmidt et al. | 285/424 X |
| 971,400 | 9/1910 | Orwig | 285/390 |
| 996,708 | 7/1911 | Feldt | 285/390 |
| 1,140,981 | 5/1915 | Holmquist | 113/116 UT UX |
| 3,471,179 | 10/1969 | Sixt | 285/260 X |

*Primary Examiner*—Charlie T. Moon

[57] ABSTRACT

A method of reforming one end of a length of helically corrugated sheet metal conduit by providing a tapered crimp so that said end is adapted to be lockingly received into an unreformed end of another length of like conduit for establishing an axial connection therebetween.

1 Claim, 6 Drawing Figures

CONDUIT END CONNECTION

BACKGROUND OF THE INVENTION

This invention relates to a method of reforming one end of a length of helically corrugated wall sheet metal conduit so that said end is adapted to be lockingly received into an unreformed end of another length of like conduit for establishing an axial connection therebetween. The method involves reforming one end by crimping over the helical corrugation to define a taper of a diameter size and shape to be received into another end. The crimping step provides a taper on the wall, yet does not entirely destroy the helical corrugation, thus defining tapered threading on the end for cooperation with unreformed helical corrugations (defining threading) on the other length. For round conduit, turning of the lengths relative to each other secure the threading. In other shapes, axial force causes the resilient walls to temporarily deform to engage threading. Thus, a strong and reasonably tight connection is established between lengths of conduit for carrying air at low pressure.

Many ways have been proposed heretobefore for connecting lengths of metal conduit, such as corrugated wall conduit, in axial communication. It has been found difficult, however, to provide an effective solid joint or connection that is reasonably tight because of cross alignment of corrugations. Reforming an end of a length of conduit having helically corrugated walls to have a smooth cylindrical wall has been found difficult because of substantial reworking of the metal. Sleeve inserts and mechanical holding device have been proposed.

BRIEF SUMMARY OF THE INVENTION

It is an object of this invention to provide a method of establishing a strong and tight connection between lengths of helically corrugated conduit.

It is another object of this invention to provide a connection between lengths of helically corrugated conduit by providing a tapered crimp on one end over helical corrugations to define a tapered portion of a reduced diameter and having threading adapted to be received into another length of conduit for engagement with the corrugations thereof.

It is a still further object of this invention to provide a connection between lengths of helically corrugated wall conduit by taper crimping the corrugations on one end of a length of conduit to establish a reduced diameter without entirely destroying the threading, and screwing the crimped end into the helical corrugations of an uncrimped end of another length of conduit.

BRIEF DESCRIPTION OF THE DRAWINGS

The invention will be more fully understood and further objects and advantages thereof will become apparent when reference is made to the following detailed description of the preferred embodiment of the invention and the accompanying drawings in which.

DESCRIPTION OF THE PREFERRED EMBODIMENTS

Figure 1:
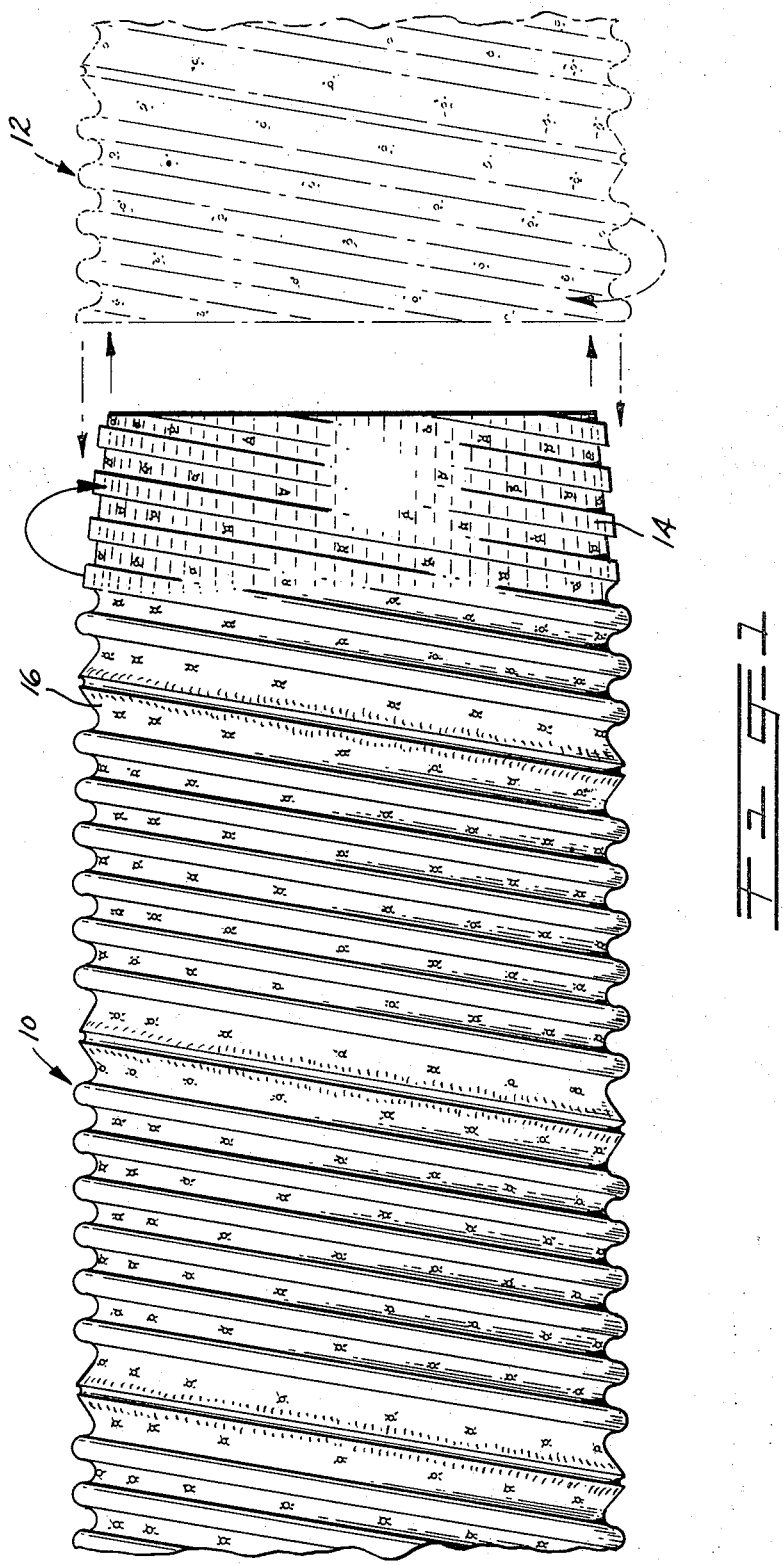
FIG. 1 is an elevation of a portion of a length of conduit showing a crimped end which is adapted to be inserted into an uncrimped end of another length of conduit which is shown in phantom.

Referring to the illustration in FIG. 1, there are shown portions 10 and 12 of lengths of round helically corrugated conduit or ducting which are adapted to be axially connected. End 14 of one portion has been provided with a tapering crimp to a size and shape adapted to be received within the uncrimped and untapered end of the other portion.

The process by which sheet metal conduit or ducting of the type illustrated may be formed is disclosed in U.S. Pat. Nos. 3,538,728; 3,435,852 or 3,621,884. As shown in these patents an elongate substantially continuous strip of metal (steel or aluminum) is passed between opposed contoured roller where corrugations are formed therein, and the edges of adjacent convolutions are secured together by a folded seam to define the conduit or ducting.

The corrugations and seams, while running longitudinally of the strips, assume a helical lead corresponding to that of the strip. Seams such as identified by the numeral 16 of FIG. 1 between adjacent convolutions, also disclosed in the above patents, may be dimpled for greater strength. The invention, however, is generic and may be applied to various corrugated walls. The conduit is usually originally produced in round cross-section, and may later take other shapes if desired.

Figure 2:
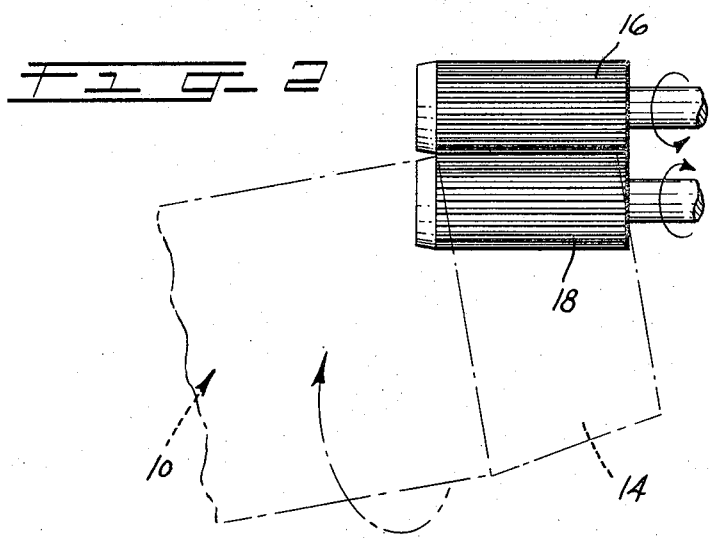
FIG. 2 shows a pair of mating crimping rollers adapted to apply a tapered crimp to a conduit end.

FIG. 2 illustrates a pair of opposed crimping rollers for providing crimping in the conduit wall at end 14 of length 10. The longitudinal axis of conduit length 10 (shown in phantom) is disposed at a slight angle of about 5° – 10° with respect to the axis of the rollers so that a tapered crimp will be provided therein.

Figure 3:
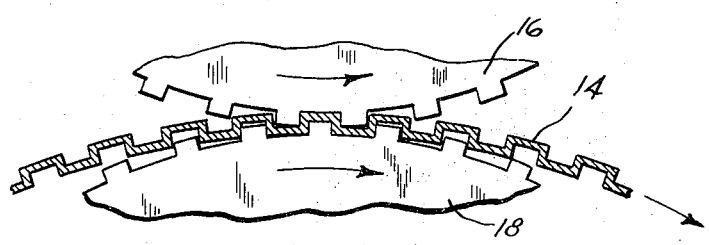
FIG. 3 is an enlarged fragmentary end view of the rollers shown performing the crimping step.

FIG. 3 is an enlarged partially fragmentary axial view of the crimping step illustrating end 14 of the conduit passing between rollers 16 and 18.

Figure 4:
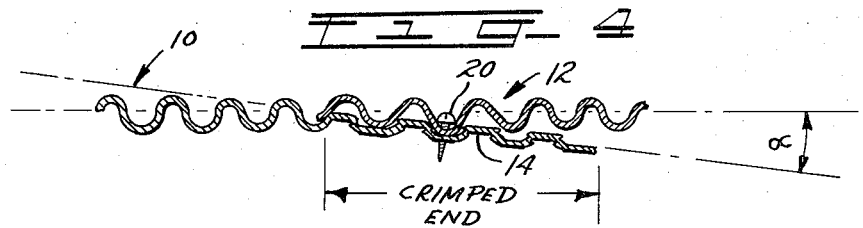
FIG. 4 is an enlarged cross-sectional view taken through the conduit walls and showing their threading engagement.

In FIG. 4 there is illustrated in cross-section the threading engagement between the two ends of the conduit to be connected. Crimped end 14, having a taper applied thereto, still retains some of the helical threading effect which existed by reason of the helical corrugations in the conduit. However, the mean diameter of the crimped end is less than the mean diameter of the remainder of the conduit. Since the crimped end is reduced in diameter, it is adapted to be threaded into the uncrimped end of length 12. Interference between the mating threading contours insures the establishment of a strong connection. If desired, additional means, such as screws 20, may be inserted between or through the mating end walls to reinforce the connection. Adhesives may also be applied between the threading for reinforcing the connection and to make it tight.

Figures 5, 6:
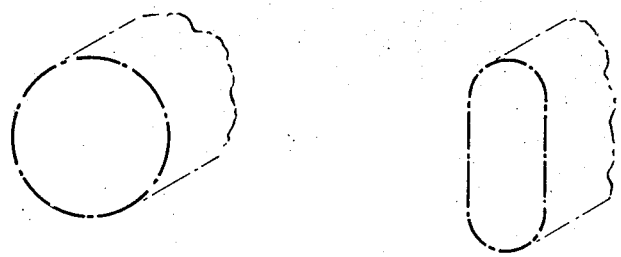
FIG. 5 illustrates a round conduit defining a shape adapted to receive a tapered crimp at the end; and, FIG. 6 illustrates an oblong or flattened shape formed from the round conduit shown in FIG. 5 and to which a tapered crimp may then be applied.

FIG. 6 illustrates an oblong or flattened shape which may be formed from the round shape conduit of FIG. 5. The round conduit may be placed over an expansible mandrel, or the like, whereby the desired oblong or flattened shape is obtained. Thereafter the end of the oblong or flattened shape may be passed between crimping rollers such as 16, 18 as before.

Helical corrugations extend throughout each conduit length. One end of each length is provided with a crimp in the corrugated wall in a manner whereby its elongate creases are disposed generally longitudinally of the conduit and transverse to the corrugations. The crimping is accomplished by rolling the wall at the end between opposed crimping rollers 16 and 18. The axes of the crimping rollers are disposed at a slight angle to the longitudinal axis of the conduit. In this manner, as the crimp is formed in the corrugated wall, it is also disposed at an angle to define a taper of some 5°–10° thereby providing a decreasing diameter toward its axial extremity. As a crimp is applied in the walls over the corrugations there is a partial collapse of the corrugation resulting in a multiple sheet metal thickness in some places and a single thickness in other places. It is to be noted that the helical formations are not altogether destroyed, though reduced in amplitude, and some threading effect remains in the tapered end. This is illustrated in FIG. 4.

The other end of the same length is left unreformed (ie, uncrimped) so that the helical corrugations therein define a thread path for receiving a tapered end of another conduit length. For establishing a connection, as illustrated in FIG. 1, the tapered end 14 is moved axially into an unreformed end of another length 12, and, thereafter twisted or rotated so as to bring the threading of the formations into engagement. This is the preferred method of engagement. Engagement may be established between the threading by forcing the ends together in an axial direction so as to cause the formations to jump over each other into locking position. Obviously this method of axial engagement is required on conduit shapes other than round wherein one end could not be twisted within the other.

It will be noted in FIG. 1 that perforations are provided in the walls of the conduit. These perforations are for a purpose which is disclosed in the above-mentioned patents, but are in no way a limitation on the invention herein which relates to the establishment of a connection. The invention is generic to various wall formations.

I have disclosed a preferred embodiment of my invention. Modifications or variations can be made thereto without departing from the scope of the invention which is defined in the claims.

I claim:

1. A length of metal conduit comprising:

a helically corrugated tubular wall having a generally round transverse cross-section and a uniform mean diameter for a major longitudinal extent thereof, a first end portion of said tubular wall having a diameter substantially equal to the mean diameter of the tubular wall, a second end portion of said tubular wall having partially collapsed external helical corrugations thereon, said second end portion having a reduced mean diameter relative to the mean diameter of the tubular wall and said second end portion being tapered with the diameter of said second end portion diminishing toward an extremity of said second end portion whereby said second end portion is adapted to be inserted into a first end portion of another length of similar conduit and turned therein for causing threading engagement with helical corrugations of the similar conduit to establish a connection therebetween.

* * * * *